US012801360B2

(12) United States Patent
Kogelman

(10) Patent No.: US 12,801,360 B2
(45) Date of Patent: Nov. 17, 2026

(54) CONVERTING PULL-BASED CODE INTO PUSH-BASED CODE

(71) Applicant: Electronic Arts Inc., Redwood City, CA (US)

(72) Inventor: Jean-Paul Alexander Kogelman, Vancouver (CA)

(*) Notice: Subject to any disclaimer, the term of this patent is extended or adjusted under 35 U.S.C. 154(b) by 362 days.

(21) Appl. No.: 18/428,013

(22) Filed: Jan. 31, 2024

(65) Prior Publication Data

US 2025/0244982 A1 Jul. 31, 2025

(51) Int. Cl.
*G06F 9/44* (2018.01)
*G06F 8/34* (2018.01)
*G06F 8/35* (2018.01)
*G06F 8/51* (2018.01)

(52) U.S. Cl.
CPC .................. *G06F 8/51* (2013.01); *G06F 8/34* (2013.01); *G06F 8/35* (2013.01)

(58) Field of Classification Search
CPC ................. G06F 8/51; G06F 8/34; G06F 8/35
See application file for complete search history.

(56) References Cited

U.S. PATENT DOCUMENTS

| | | | | |
|---|---|---|---|---|
| 9,513,880 | B2 * | 12/2016 | Avadhanula | G06F 8/51 |
| 2024/0261692 | A1 * | 8/2024 | Sliwka | H04L 9/3213 |
| 2024/0385855 | A1 * | 11/2024 | Yasue | G06F 9/448 |
| 2025/0045049 | A1 * | 2/2025 | Sundaresan | G06F 8/77 |
| 2025/0244979 | A1 * | 7/2025 | Janicic | G06F 8/443 |

* cited by examiner

*Primary Examiner* — Qamrun Nahar
(74) *Attorney, Agent, or Firm* — Lee & Hayes, P.C.

(57) ABSTRACT

A system may provide for the converting pull-based program code into push-based program code. The system may receive source code comprising pull-based programming language instructions, wherein the pull-based programming language instructions comprise a plurality of nodes connected by a plurality of edges to form a directed graph and convert the source code into push-based programming language instructions at least in part by traversing the pull-based programming language instructions to determine one or more scopes of the directed graph including respective groups of one or more nodes of the plurality of nodes, the determining of the one or more scopes associated with one or more conditional nodes of the plurality of nodes and generating the push-based programming language instructions for the source code based on the one or more scopes of the directed graph.

19 Claims, 12 Drawing Sheets

500

```
void main()
{
if (computeTheOutputOfNode1())                              504
{
        result1 = computeTheOutputOfNode3();                506
}
else
{
        FunctionScope23(result2);                           508
        result1 = computeTheOutputOfNode4(result2);         510
}
if (computeTheOutputOfNode5())                              512
{
        FunctionScope23(result2);                           514
        result3 = computeTheOutputOfNode7(result2);         516
}
else
{
        result3 = computeTheOutputOfNode8();                518
}

computeNode9(result1, result3);                             520

return;

}

void FunctionScope23(result2)                               522
{
        static bool Function23=0;                           524

        if (Function23)                                     526
        {
        return;
        }
        Function23=1;                                       528
        result2 = computeTheOutputOfNode10();               530
        return;
}
```

FIG. 5A

CONVERTING PULL-BASED CODE INTO PUSH-BASED CODE

BACKGROUND

Pull-based visual programming is a method of describing behavior in many systems such as animation, rendering, gameplay, and so on. Pull-based visual programming may be useful for users with or without a programming background. At the same time, executing computer instructions programmed using pull-based programming may be more costly than computer instructions programmed using push-based programming.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 5A and 5B illustrate example push-based codes that may be generated for the visual graph-based code during the build process, in accordance with example embodiments of the disclosure.

DETAILED DESCRIPTION

Figure 1:
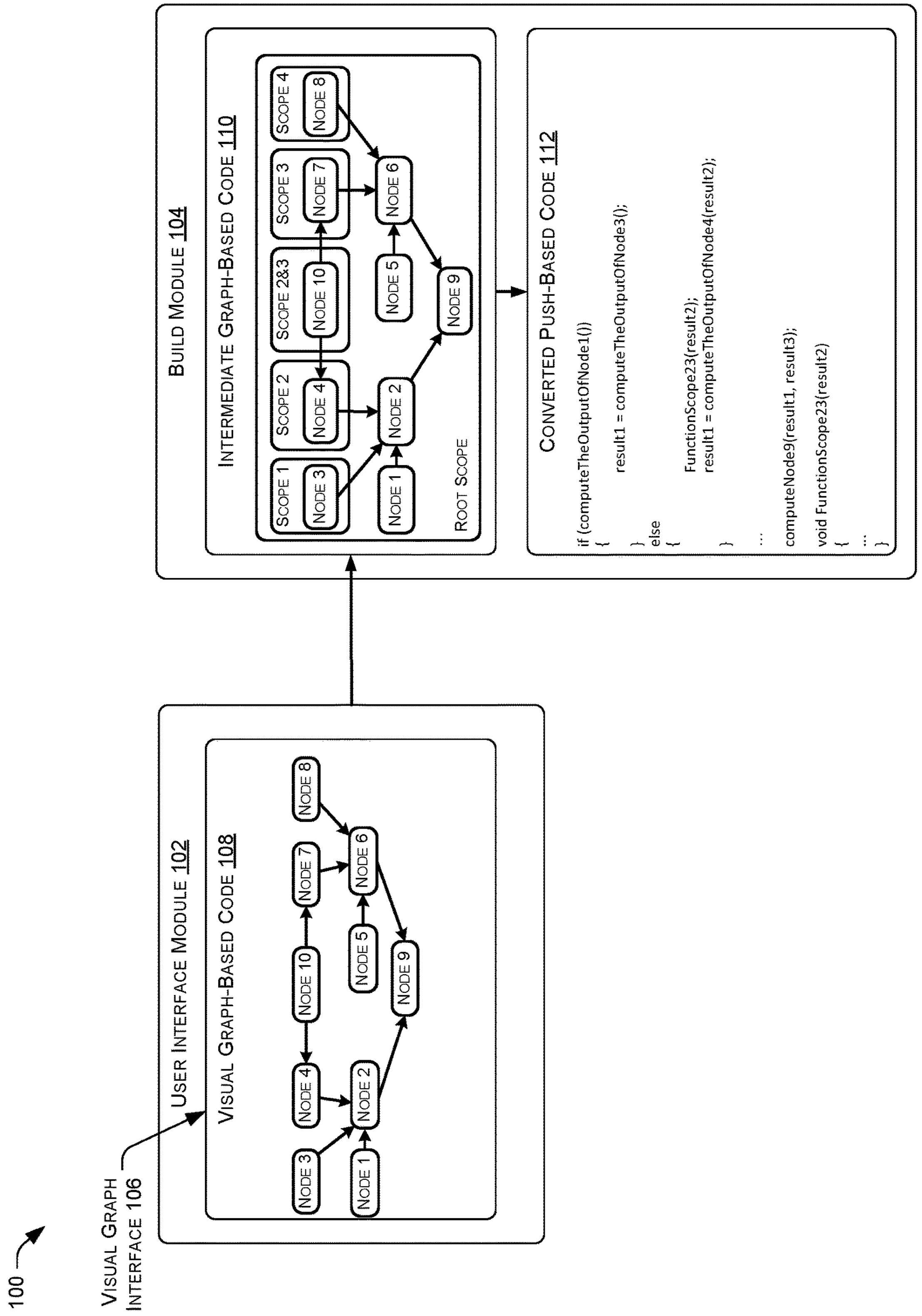
FIG. 1 illustrates a schematic diagram of an example system including a user interface module and a build module that may convert pull-based programming to push-based programming, in accordance with example embodiments of the disclosure.

Example embodiments of this disclosure describe methods, apparatuses, computer-readable media, and system(s) that may allow for programming environments that may provide for the benefits of pull-based programming (e.g., visual graph-based programming) and push-based programming. In example embodiments of the disclosure, a compiler or build pipeline may operate to interpret a pull-based representation of program code into a push-based representation (e.g., program code in a textual push-based programming representation, a data structure representing the equivalent push-based program code or the like, hereinafter referred to together as push-based code unless otherwise specified)). The compiler or build pipeline may then generate byte code or other executable code based on the push-based program code.

Examples herein may discuss pull-based program code in the context of graph-based program code and push-based program code in the context of a textual representation. However, examples are not limited and the techniques and methods disclosed herein may be applied to other pull-based program code types and other push-based program code types. In pull-based systems, the code units or nodes may wait until a result (e.g., an input to a node) is demanded and work backwards through the code units or nodes to determine the demanded input. Push-based systems may take events and push them through nodes or code units to achieve a result.

Example embodiments of the disclosure may include a programming environment including a user interface and compiler or other build pipeline (hereinafter referred to as "build module" or "compiler" unless otherwise specified). The user interface may provide for entry of pull-based program code in a visual graph-based programming language.

For example, a visual graph-based programming interface may provide for design or entry of visual graph-based code. Such visual graph-based code may include visual graph-based programming language instructions using a node and edge syntax that may form a directed graph of operations. The nodes may represent functions or operations. For example, one or more of the nodes may be native function call nodes of the visual graph-based programming language (e.g., conditionals, assignment, add, square, square root, etc.). The edges between nodes may represent data flows (e.g., input and output of variables or values) and/or control between nodes flows (e.g., to provide a direction to the directed graph).

In some examples, execution of such graph-based program code may be costly to compute as it may entail traversing the nodes of the graph in a recursive fashion. The communication between nodes may involve the stack and, while the graph-based program code is executing, the transient data required to compute a node may be stored while one of the other nodes is being evaluated.

In a push-based system, the recursion may be removed, which may reduce pressure on the stack to store temporary data. Instead, intermediates may be stored in known locations and, when a node is executed, its inputs have already been provided. As such, no internal iteration to fetch these values may be required. Temporary values may be maintained in a small block of memory that may be constantly reused. Further, types can be kept alive. As such, excessive construction and destruction of complex types may be avoided.

As mentioned above, during a build process, the pull-based code of the graph-based programming code may be interpreted into an equivalent push-based representation. Some examples may group nodes of the graph-based program code into scopes. The scopes may include a root scope and additional scopes for paths of conditional inputs of conditional nodes of the graph-based program code (e.g., if-then nodes, if-then-else nodes, switch nodes, etc.). More particularly, in some examples, the build process may include a traversal of the program code from a last node upward through the graph along the edges representing inputs to the nodes. When a conditional node is encountered, the build process may create a new scope for the conditional input(s) or path(s) of the conditional node before traversing upward along the edge connected to the conditional input. Nodes traversed above the conditional input may be added to the scope created for the conditional path. As discussed in more detail below, the result of the traversal is a scoped pull-based programming code.

In some examples, the scoped pull-based programming code may be further processed to reduce the number of scopes. For example, a node may belong to more than one scope if the output of the node is provided to or is determinative of multiple conditional inputs and/or multiple conditional nodes. In such an example, the build process may include reducing such shared scopes if possible. Where shared scopes are not reducible, the build process may include the instructions associated with the shared scope in a separate block or function and may include guard functionality to prevent the function from being executed more than once.

The scoped pull-based programming code or representation may again be traversed or processed to generate push-based program code. The compiler may then generate bytecode or other executable code based on the push-based program code.

In some embodiments, the resulting bytecode for the original visual program code may provide an advantage in that it may be more efficient because it may eliminate recursion in the pull-based approach which may make it both faster to execute in a tighter loop and may cause the program code to use less memory since there may be no transient state on the stack.

Certain implementations and embodiments of the disclosure will now be described more fully below with reference to the accompanying figures, in which various aspects are shown. The following discussion focuses on environments that convert from visual graph-based code to a text-based code. However, the various aspects may be implemented in many different forms and should not be construed as limited to the implementations set forth herein. For example, while the discussion focuses on visual graph-based code, the various aspects may be implemented for code units and control flow of other pull-based program code types. Code units may refer to sections or sets of instructions, regardless of language, which represent logical operations in the same or similar manner as the nodes of a visual graph-based language. Control flow may refer to the logical flow or connection between code units, regardless of language, that control the flow of operations between code units. For example, control flow of a text-based language may be determined by the flow or connection between textual operations from jump statements, conditional statements (e.g., if-then statements, if-then-else statements, switch statements, etc.), the order of instructions in the text, parentheses and/or brackets and other rules of the programming language. It will be appreciated that the disclosure encompasses other variations of the embodiments, as described herein. Like numbers refer to like elements throughout.

FIG. 1 illustrates a schematic diagram of an example system 100 including a user interface module 102 and a build module 104 that may convert pull-based programming to push-based programming, in accordance with example embodiments of the disclosure.

In operation, the user interface module 102 may provide a visual graph interface 106 for entry of source code including visual graph-based code 108. The visual graph-based code may include nodes and edges of a graph. The source code may be output to the build module 104.

The build module 104 may receive the visual graph-based code 108 which may include a plurality of nodes connected by edges to form a directed graph and determine a converted textual push-based code 112 based on the visual graph-based code 108. In some examples, the build module may determine an intermediate graph-based code 110 based on the visual graph-based code 108. As illustrated, the intermediate graph-based code 110 may include scope information. For example, the build module 104 may traverse a directed graph of the visual graph-based code 108 (e.g., traverse the nodes via the edges) to determine scopes for plurality of nodes. The build module 104 may further operate to reduce the determined scopes for the plurality of nodes (not shown). Additional details regarding the traversal of nodes by the edges of directed graph to determine scopes for the plurality of nodes is provided below with regard to FIGS. 2A-8.

The build module 104 may then determine converted textual push-based code 112 based on the intermediate graph-based code 110. As discussed below, the build module may generate lists of operations for the nodes of the scopes and determine a root list of instructions from the respective lists of operations of the scopes based on parent-child relations of scopes. Additional details regarding the determination of converted textual push-based code based on the intermediate graph-based code 110 is provided below with regard to FIG. 2A-8.

Though example implementation details are discussed above, variations are possible. For example, although examples herein discuss pull-based program code in the context of graph-based program code and push-based program code in the context of a textual representation, this is merely for ease of illustration and embodiments may applied to other pull-based program code types and other push-based program code types.

FIGS. 2A-2C and 3 illustrate an example pull-based code and example stages of conversion of the example pull-based code into example push-based code.

Figure 2A:
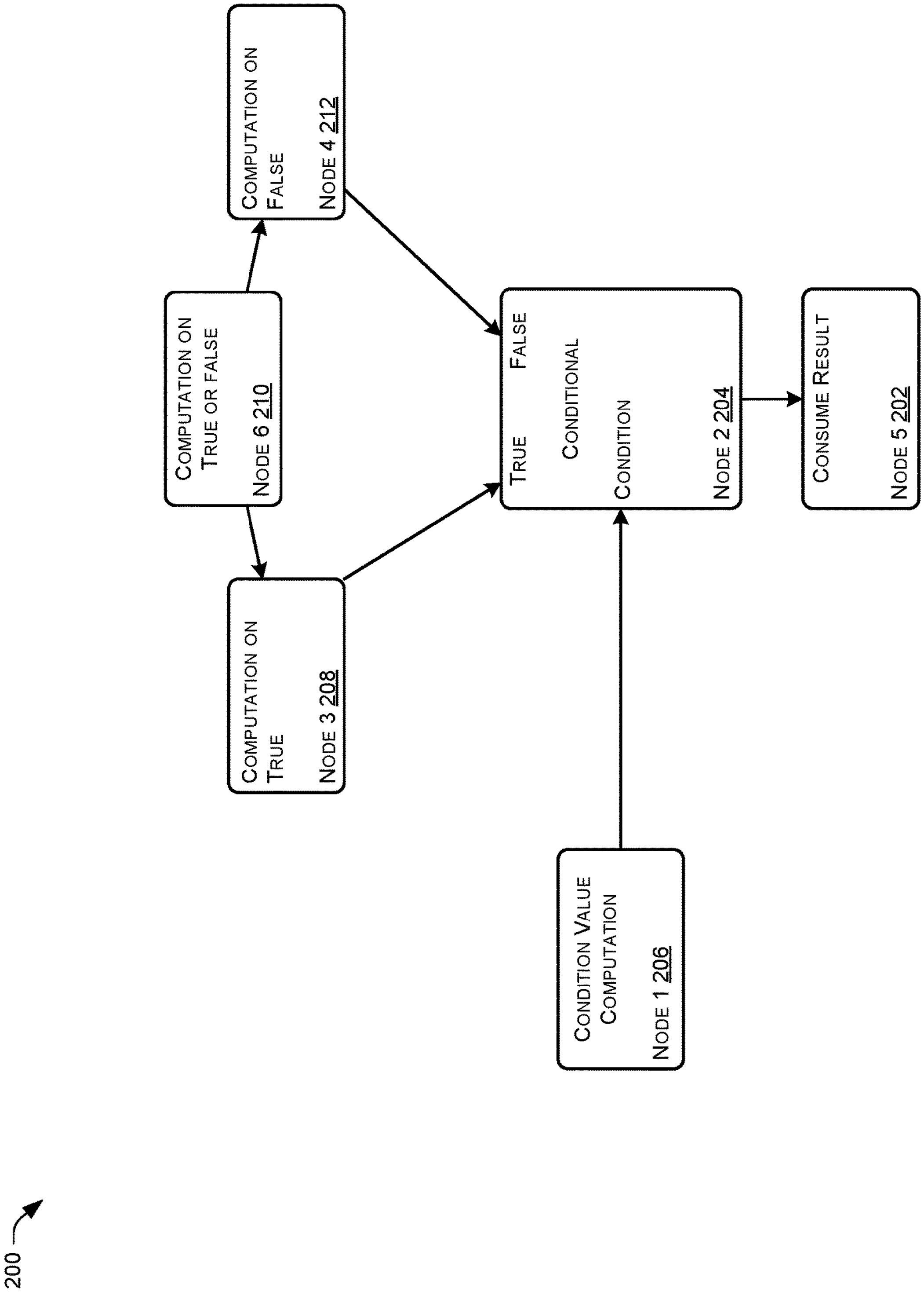
FIGS. 2A-2C illustrate an example pull-based code and example stages of conversion of the example pull-based code into example push-based code, in accordance with example embodiments of the disclosure.

FIG. 2A illustrates an example pull-based code 200, in accordance with example embodiments of the disclosure. The example pull-based code may be example graph-based code that include nodes and edges that form a directed graph. The example pull-based code 200 may be an example view output by the user interface module 102.

As illustrated, the pull-based code 200 includes a plurality of nodes 202-212. The plurality of nodes includes a computation node 1 206, a computation node 3 208, a computation node 4 212, a computation node 6 210, a return node 5 202 and a conditional node 2 204. Further, the nodes 202-212 of the graph-based code are connected by edges that may indicate the direction of control flow between the nodes of the graph. The edges are connected to various input ports and output ports of the nodes. Except where otherwise noted, the input ports may represent requested input variables based on computation by the nodes above the input port. As illustrated, the input ports of node 2 204 relate to the conditional function of the node. Specifically, an input port from node 1 206 may represent a value based upon which a conditional determination may be evaluated by node 2 204. If the condition is evaluated as true based on the input from node 1 206, the conditional node 2 204 may output a value received from node 3 208 at the "True" port to node 5 202. If the condition is evaluated as false based on the input from node 1 206, the conditional node 2 204 may output a value received from node 4 212 at the "False" port to node 5 202.

As the example graph-based code is pull-based, the computation performed by nodes 3 and 4 may be conditional on the request of node 2 based on its condition determination. Similarly, node 6 may be subject to request by nodes 3 and 4. However, node 6 will perform computation regardless of the condition determination of node 2 because the output of node 6 will be requested by either node 3 if the condition determination is true or node 4 if the condition determination is false. As will be discussed below with regard to FIGS. 2B and 2C, in some examples, because node 6 will be performed on both outcomes of the conditional determination of node 2, the scope of node 6 may be reduced to a lower level scope (e.g., root scope or a scope of the conditional that owns the nodes that may request an output of node 6). More particularly, the scope of node 6 may be reduced to the scope of node 2 as discussed below.

In the example of FIG. 2A, in a pull-based system, node 5 202 may be identified as being the point where traversal of the graph starts. From there, the traversal may go up to node 2, identify it as a conditional node, traverse to node 1, and see that node 1 has no other inputs. The traversal may then execute the code associated with node 1 and the return result to node 2. Based on the result of node 1, the traversal may then either traverse to node 3 or node 4. From either node 3 or node 4, the traversal may continue up to node 6 and execute the node. Node 6 may output a result to the requesting node (e.g., node 3 or 4). Node 3 or 4 may receive the result of node 6 and determine an output to node 2. The traversal may continue to pass the result back down to node 5 and execute node 5 with the result of the conditional, which is either the result of node 3 or node 4.

To convert the graph-based code of FIG. 2A into a list of instructions of a push-based representation, some examples may group the nodes into scopes. For example, the build module 104 may start out with a root scope (e.g., or a scope number 0) and all nodes in the graph may be added to this scope. The build module 104 may then perform a traversal of the graph to assign additional scopes. For example, when the build module encounters a conditional node such as conditional node 2 204, the build module 104 may traverse up the edge connected to the True path and add nodes found above the True port in the graph to a scope 1 which has a parent scope of 0 and which is owned by node 2. Then, the build module 104 may traverse up the edge connected to the False port and add nodes found above the False port in the graph to a scope 2 which has a parent scope of 0 and which is owned by node 2. The assignment of additional scopes may be performed each time a conditional node is encountered during the traversal. As node 6 210 is above both the True and False ports of node 2 204 in the traversal, node 6 may be assigned to both scope 1 and scope 2.

Figure 2B:
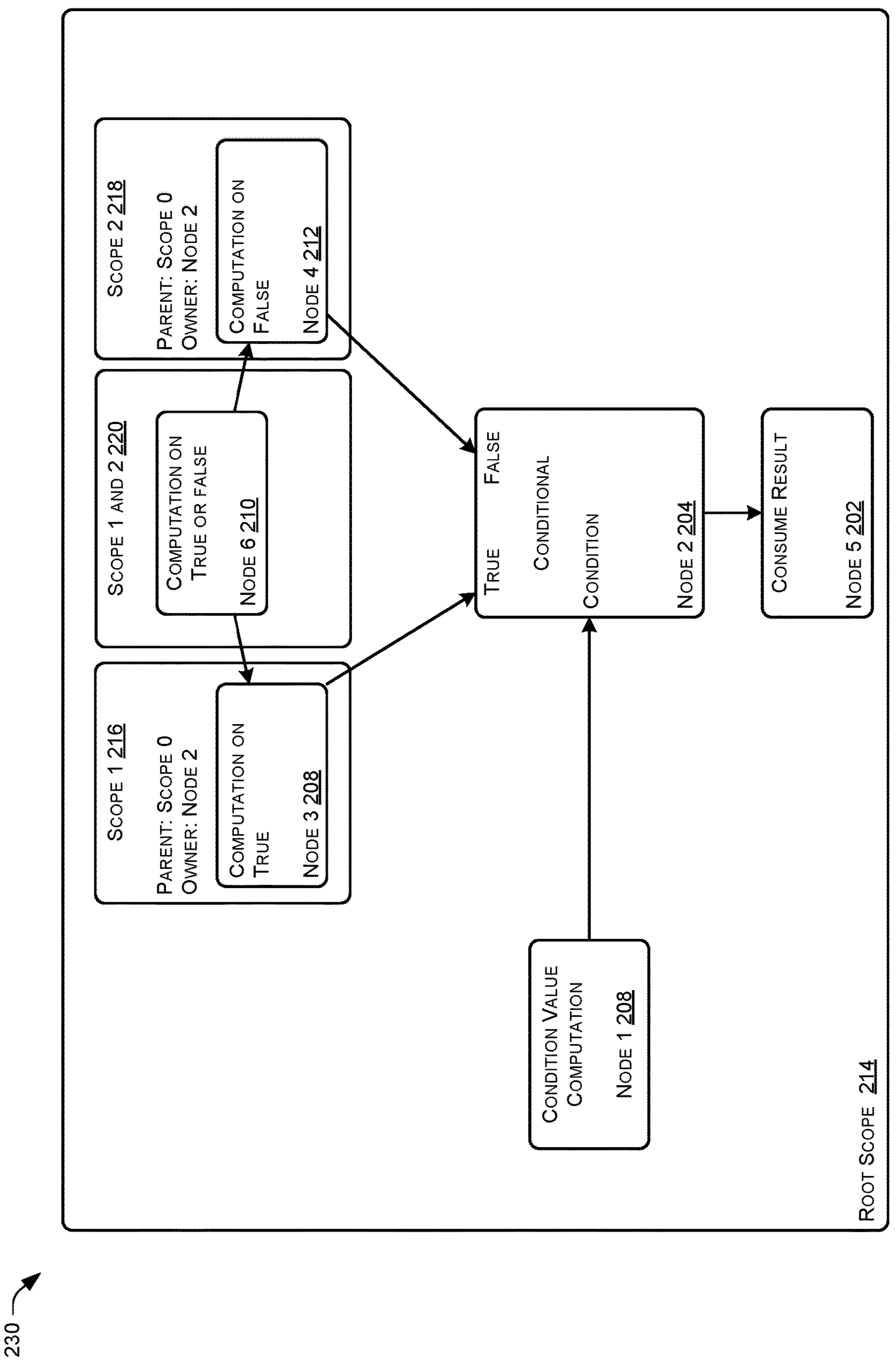

FIG. 2B illustrates example graph-based code 230 that may illustrate an intermediate representation generated for the visual graph-based code during the build process. More particularly, the example graph-based code 230 may illustrate the graph-based code 200 after the above process for adding scopes. More particularly, FIG. 2B illustrates that a root scope 214 has been added which includes all the nodes. The traversal further added node 3 208 and node 6 210 to the scope 1 216 and node 4 212 and node 6 210 to the scope 2 218.

The build module 104 may then operate to reduce the scopes of the graph nodes. As discussed above, node 3 and node 4 both request computation from node 6 210. This "shared node" may be executed in either case but the push-based instructions generated by the build module should include and execute the instructions of node 6 once. Since node 6 executes in both the True and the False case, the build module may reduce the scopes of node 6 210 to the parent scope(s) of both scope 1 216 and 2 218. The parent scope of scopes 1 216 and 2 218 is the root scope.

Figure 2C:
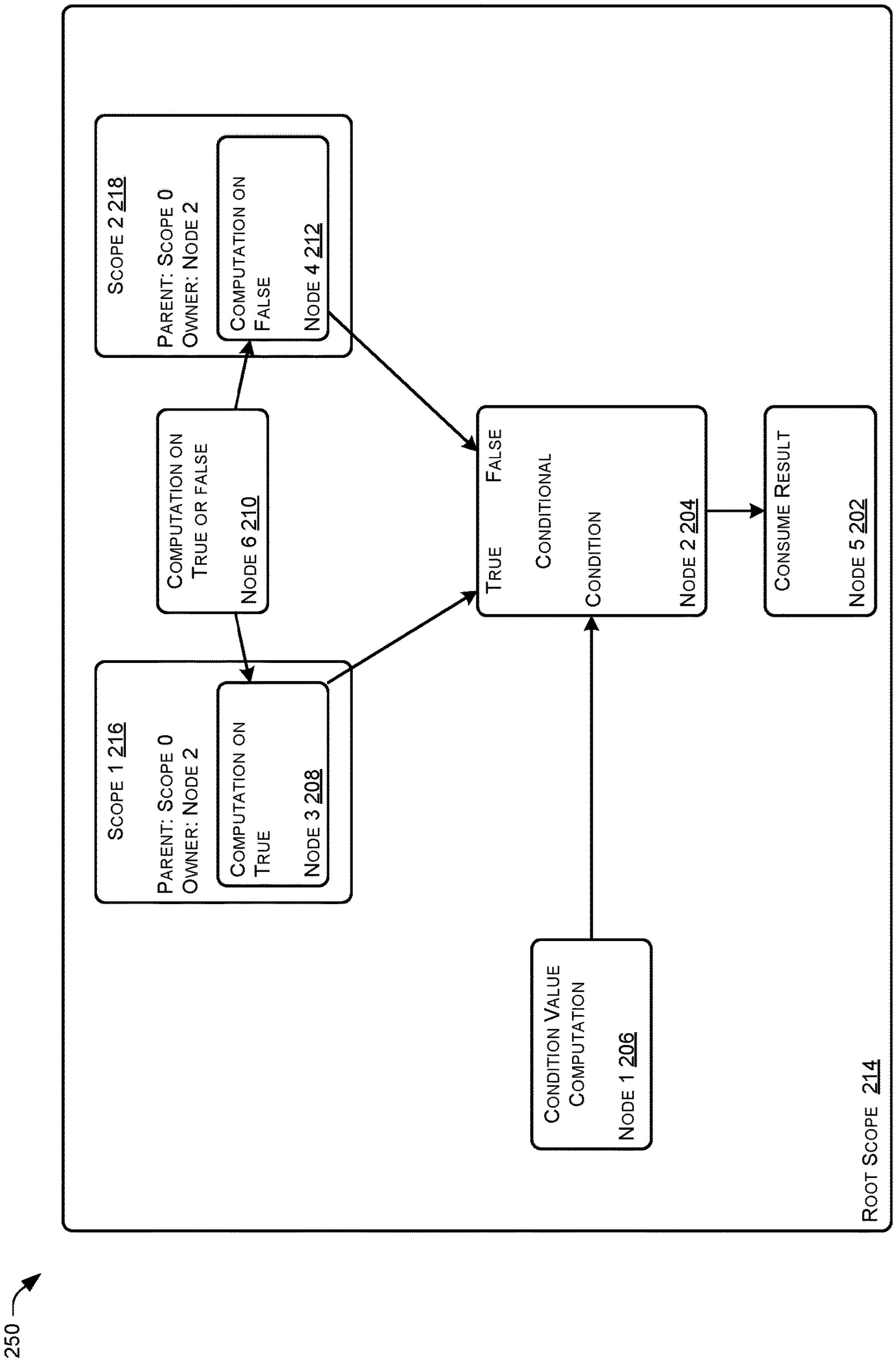

FIG. 2C illustrates example graph-based code 250 that may illustrate a reduced scope representation generated for the visual graph-based code during the build process. More particularly, the example graph-based code 250 is illustrated following the reduction in scope of node 6 210 from the shared scopes 1 216 and 2 218 to the root scope 214.

The build module 104 may then traverse the reduced scoped graph-based code to generate push-based code. An example of the resulting push-based code is illustrated in FIG. 3.

Figure 3:
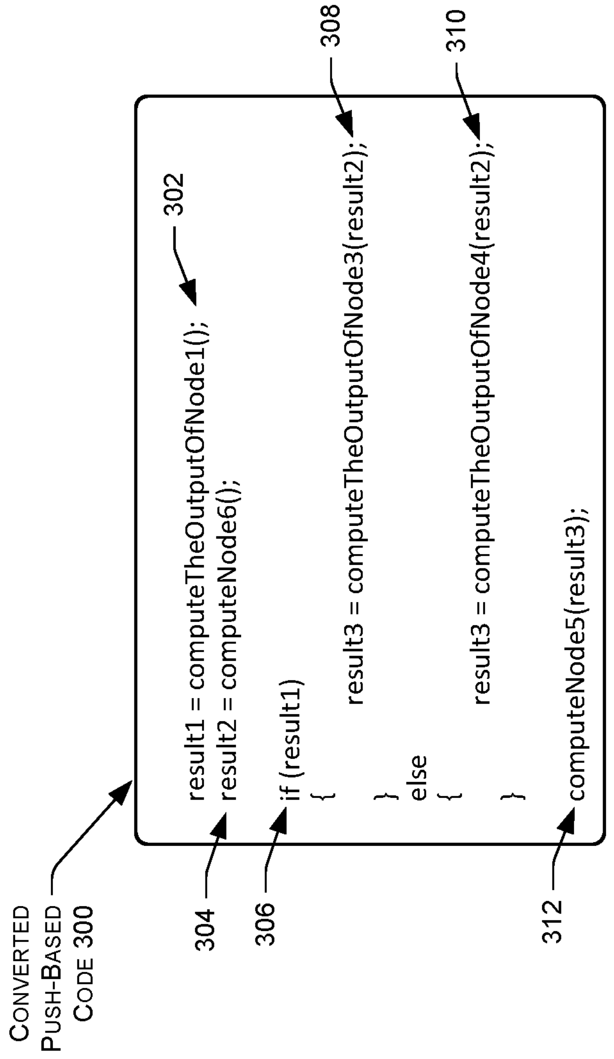
FIG. 3 illustrates example push-based code that may be generated for the visual graph-based code during the build process, in accordance with example embodiments of the disclosure.

FIG. 3 illustrates example push-based code 300 that may be generated for the visual graph-based code during the build process. More particularly, example push-based code 300 may be generated by the build module 104 based on the reduced scoped graph-based code 250.

The build module 104 may create a root scope list and begin the conversion of the scoped reduced graph-based code 250 by determining that node 5 202 is the last node of the graph-based code. Because node 5 202 includes an unprocessed input port, the build module may set the source node of the unprocessed input port, specifically node 2 204, as the current node.

Because node 2 204 includes an unprocessed input port, the build module may set the source node of the unprocessed input port, specifically node 1 206, as the current node. Because node 1 206 as no input ports and does not have a shared scope, the build module 104 may insert instructions 302 for node 1 206 into the root scope list.

The build module 104 may then return to node 2 204. The build module 104 may create a scope 1 list and then set the source of the input of the true port, node 3 208, as the current node. The build module 104 may continue to the input of node 3 206, namely node 6 210.

The build module 104 may determine that node 6 210 has no input and is part of the root scope 214. Accordingly, the build module may insert node 6 210 into the root scope list. Because node 6 210 as a lower scope than the node requesting its output, the instructions for node 6 may be inserted to the root scope list before instructions related to the node that owns the scope of the requesting node. For example, the instructions 304 associated with node 6 210 may be inserted into the root scope list before instructions associated with node 2 306. The variable name for the result of node 6 may be recorded for subsequent usage by node 3 or any other node requesting the output of node 6 (e.g., result 2 in FIG. 3).

The build module 104 may return to node 3 208 and insert instructions for node 3 into the scope 1 list. The build module 104 may then return to node 2 204, create a scope 2 list, and traverse up the false path through node 4 212. The build module may determine that node 6 has already been processed. The build module 104 may then return to node 4 212 and insert instructions for node 4 into the scope 2 list.

The build module 104 may then return to node 2 204. Without further unprocessed input ports at node 2, the build module 104 may generate and insert instructions for node 2 204 and the scope 1 216 list and scope 2 218 list into the root scope list in the appropriate spots. For example, build module 104 may insert an "if else" structure 306 based on the result of node 1 (e.g., result1) including insertion points for the scope 1 list and the scope 2 list. The build module 104 may then insert, into the insertions points, instructions 308 for node 3 and instructions for node 4 310, each based on the result of node 6 (e.g., result 2).

The build module may then return to node 5 and insert instructions 314 for node 5 that are based on the outcome of either node 3 or node 4 (e.g., result 3). The build module 104 may then terminate the traversal.

The converted text-based code 300 of FIG. 3 is merely an example. Examples are not limited to particular computer languages or types of push-based computer languages. An example using a different push-based computer language is illustrated and discussed with regard to FIG. 5B.

Figure 4:
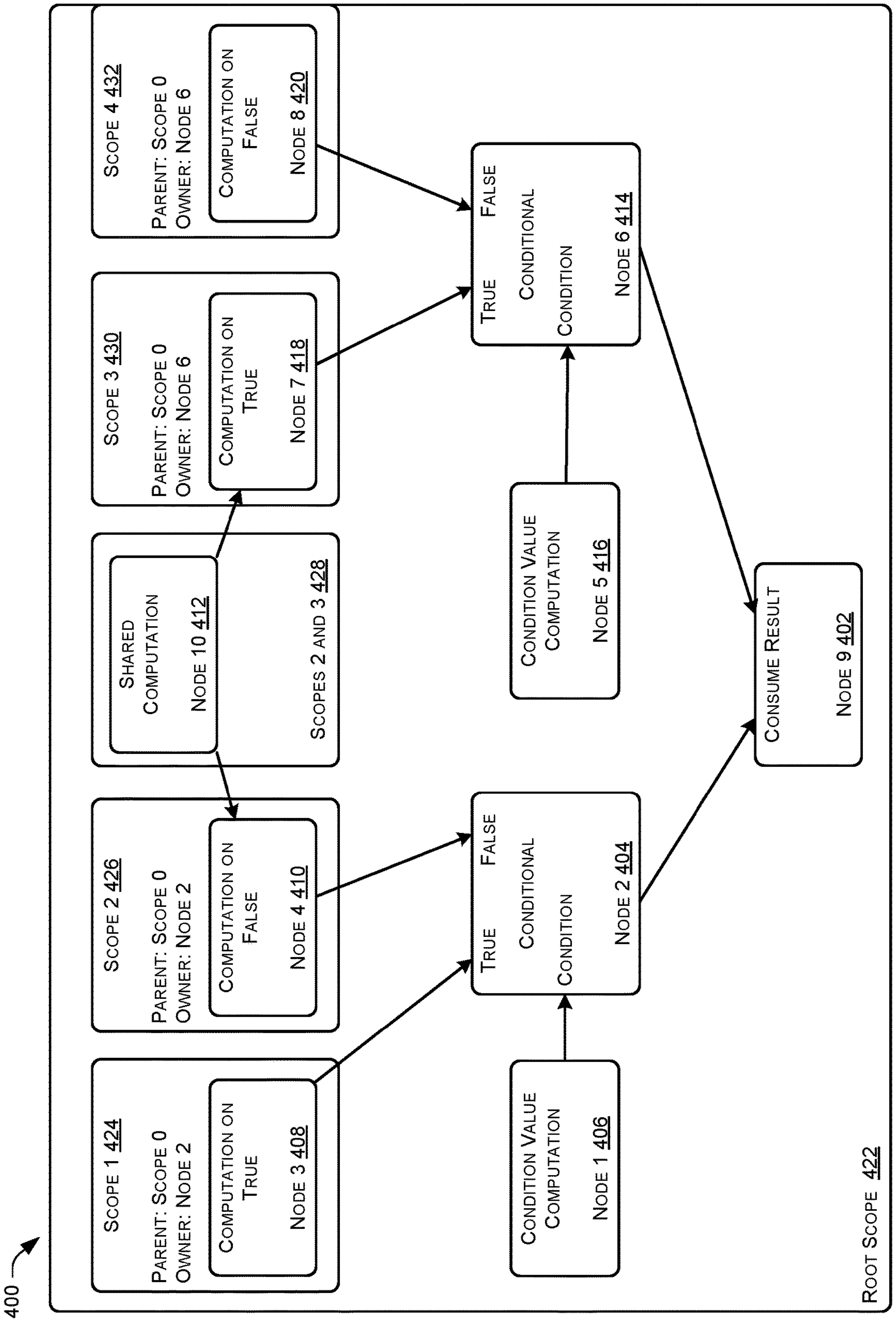
FIG. 4 illustrates another example scoped pull-based code, in accordance with example embodiments of the disclosure.

FIG. 4 illustrates another example scoped pull-based code 400, in accordance with example embodiments of the disclosure. The example pull-based code may be an example intermediate scoped graph-based code that include nodes and edges that form a directed graph with scopes determined similarly to FIG. 2B discussed above.

As illustrated, the pull-based code 400 includes a plurality of nodes 402-420. The plurality of nodes includes a computation node 1 406, a computation node 3 408, a computation node 4 410, a computation node 100 412, a computation node 5 416, a computation node 7 418, a computation node 8 420, a return node 9 402, a conditional node 2 404 and a conditional node 6 414. Further, the nodes 402-420 of the graph-based code are connected by edges that may indicate the direction of control flow between the nodes of the graph. The edges are connected to various input ports and output ports of the nodes. Except where otherwise noted, the input ports may represent requested input variables based on computation by the nodes above the input ports.

The operation of the conditional nodes 2 and 6 are similar to those discussed above. The nodes have been scoped using a similar traversal as discussed above regarding FIG. 2B with scopes 1 424 and 2 426 being assigned to nodes above the true and false ports of node 2, respectively; scopes 3 430 and 4 432 being assigned to nodes above the true and false ports of node 6, respectively; and node 10 being assigned to both scopes 2 and 3 (e.g., shared scope 428). However, unlike in the examples of FIG. 2A-3, because node 10 412 will not be performed on both outcomes of the conditional of node 2 404 or node 6 414, the scope of node 6 may not be reduced to a lower level scope (e.g., root scope or a scope of the conditional node that owns the nodes that may request an output of node 6). More particularly, the set of scopes owned by a conditional node in the ancestry of node 10 is not coextensive with set of scopes assigned to node 10. In other words, because the set of scopes that node 10 is assigned does not include all the scopes owned by one of conditional nodes 2 404 or 6 414, node 10 cannot be promoted to the parent scope of either of these conditional nodes. Instead, as discussed below, the build module 104 may create a function for the shared scope.

Figure 5B:
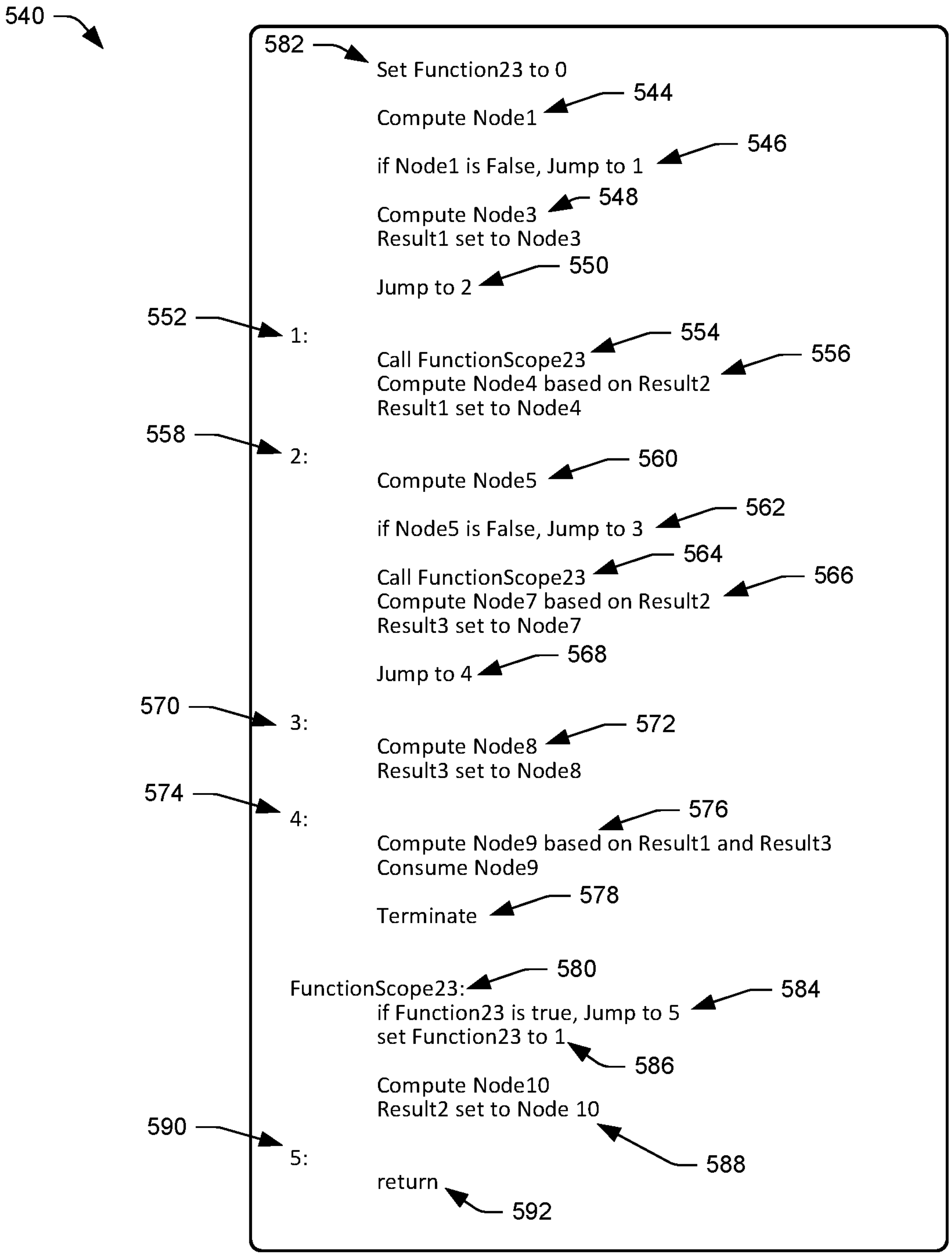

FIGS. 5A and 5B illustrate example push-based codes that may be generated for the visual graph-based code during the build process. More particularly, the example push-based codes may be generated by the build module 104 based on the scoped graph-based code 400 of FIG. 4.

FIG. 5A illustrates an example push-based code 500 that may be generated for the visual graph-based code 400 of FIG. 4. More particularly, the example push-based code 500 may be a code in a similar computer push-based language to that shown in FIG. 3.

In operation, the build module 104 may create a root scope list and begin the conversion of the graph-based code 400 by determining that node 9 402 is the last node of the graph-based code. Because node 9 402 includes an unprocessed input port, the build module may set the source node of the unprocessed input port, specifically node 2 404, as the current node.

Because node 2 404 includes an unprocessed input port, the build module may set the source node of the unprocessed input port, specifically node 1 406, as the current node. Because node 1 406 has no input ports and does not have a shared scope, the build module 104 may insert instructions for node 1 406 into the root scope list with a flag that it is the condition upon which the conditional structure of node 2 404 will operate.

The build module 104 may then return to node 2 404. The build module 104 may create a scope 1 list and then set the source of the input of the true port, node 3 408, as the current node. Because node 3 408 has no input ports and does not have a shared scope, the build module 104 may insert instructions for node 3 408 into the scope 1 list.

The build module 104 may then return to node 2 404, create a scope 2 list, and traverse up the false path through node 4 410. The build module 104 may continue to the input of node 4 410, namely node 10 412.

The build module 104 may determine that node 10 412 has no input and is part of the shared scope 428. Accordingly, the build module 104 may determine whether the node 10 412 has been traversed before. Since this is the first traversal of the shared node 10 412, the build module 104 may create a shared scope list for a function associated with the shared scope 428 and may insert a function call to the function in the scope 2 list. The build module 104 may then set the shared scope 428 as the current scope and insert the instructions for node 10 into the shared scope list. The build module may further set a flag to cause the node 10 to be treated as unprocessed in the ongoing traversal to allow for insertion of function calls in appropriate places as discussed below.

The build module 104 may then return to node 2 404. Without further unprocessed input ports at node 2, the build module 104 may generate and insert instructions for node 2 404 and the scope 1 424 list and scope 2 426 list into the root scope list in the appropriate spots. For example, build module 104 may insert an "if else" structure 504 with a condition based on the instruction for node 1. The "if else" structure 504 may include instructions 506 for node 3 for the true condition that determines a "result 1 variable" and, for the false condition, instructions 508 for a function call "FunctionScope23" which provides a "result2" variable and instructions 510 for node 4 410 based on the "result 2 variable" to determine the "result 1 variable".

The build module may then return to node 9 and traverse up the unprocessed input port to node 6. The build module may then repeat the process for the nodes above node 6 414 in the same manner as for the nodes above node 2 404 except for the handling of node 10 412. Because node 10 412 has been traversed before, the build module may handle node 10 412 by inserting the function call to the scope 3 list without recreating the shared scope list. The build module may the return to node 6 and insert instructions 512-518 into the root scope list.

The build module may then return to node 9. The build module may then insert instruction 520 for node 9 based on the outcome of node 2 and node 6 (e.g., result1 and result3). The build module 104 may then terminate the traversal and handle the creation of any functions for shared scope lists.

Specifically, the build module may insert a function 522 into the root scope list. The build module may then insert a static variable to indicate whether or not the function for the shared scope 2 and 3 has been triggered previously and set it to zero at 524. Additional instruction may be inserted to cause the function to return without re-computing the result2 variable if the variable function23 is true or one at 526. An assignment of the value of one to the function23 variable is then inserted for the first execution of the function for shared scope 2 and 3 at 528. The build module may then insert the instructions from the shared scope list for shared scope 2 and 3 at 530. Finally, the build module may insert a return instruction.

The push-based code shown in FIG. 5A is merely an example. Another example push-based code is shown in FIG. 5B.

FIG. 5B illustrates an example push-based code 540 that may be generated for the visual graph-based code 400 of FIG. 4. More particularly, the example push-based code 540 may be a code in a different push-based computer language to that shown in FIGS. 3 and 5A.

In operation, the build module 104 may create a root scope list and begin the conversion of the graph-based code 400 by determining that node 9 402 is the last node of the graph-based code. Because node 9 402 includes an unprocessed input port, the build module may set the source node of the unprocessed input port, specifically node 2 404, as the current node.

Because node 2 404 includes an unprocessed input port, the build module may set the source node of the unprocessed input port, specifically node 1 406, as the current node. Because node 1 406 has no input ports and does not have a shared scope, the build module 104 may insert instruction for node 1 206 into the root scope list at 544.

The build module 104 may then return to node 2 404. The build module 104 may create a scope 1 list and then set the source of the input of the true port, node 3 408, as the current node. Because node 3 408 has no input ports and does not have a shared scope, the build module 104 may insert instructions for node 3 408 into the scope 1 list.

The build module 104 may then return to node 2 404, create a scope 2 list, and traverse up the false path through node 4 410. The build module 104 may continue to the input of node 4 410, namely node 10 412.

The build module 104 may determine that node 10 412 has no input and is part of the shared scope 428. Accordingly, the build module 104 may determine whether the node 10 412 has been traversed before. Since this is the first traversal of the shared node 10 412, the build module 104 may create a shared scope list for a function associated with the shared scope 428 and may insert a function call to the function in the scope 2 list. The build module 104 may then set the shared scope 428 as the current scope and insert the instructions for node 10 into the shared scope list. The build module may further set a flag to cause the node 10 to be treated as unprocessed in the ongoing traversal to allow for insertion of function calls in appropriate places as discussed below.

The build module 104 may then return to node 2 404. Without further unprocessed input ports at node 2, the build module 104 may generate and insert instructions for node 2 404 and the scope 1 424 list and scope 2 426 list into the root scope list in the appropriate spots.

For example, build module 104 may insert a conditional jump instruction at 546 with a condition based on the instruction for node 1. The build module 104 may then insert the instructions for scope 1 list which include an instruction to compute node3 and set a Result1 variable at 548. The build module may then insert an additional jump instruction at 550 along with a jump marker for the target of the jump instruction at 546. The build module 104 may then insert the instructions for scope 2 list including a function call "FunctionScope23" which will include a "Result2" variable at 554 and instructions 556 to compute Node4 410 based on the "Result2" of the function call FunctionScope23 and an instruction to set a Result1 variable to the result of Node4. The build module may then insert an additional jump marker for the target of the jump instruction at 550.

The build module may then return to node 9 and traverse up the unprocessed input port to node 6. The build module may then repeat the process for the nodes above node 6 414 in the same manner as for the nodes above node 2 404 except for the handling of node 10 412. Because node 10 412 has been traversed before, the build module may handle node 10 412 by inserting the function call to the scope 3 list without recreating the shared scope list. The build module may the return to node 6 and insert instructions 560-574 into the root scope list.

The build module may then return to node 9. The build module may then insert instruction 576 for node 9 based on the outcome of node 2 and node 6 (e.g., Result1 and Result3). The build module 104 may then insert instructions to consume the results of node 9 and terminate at 578.

The build module 104 may then handle the creation of any functions for shared scope lists. Specifically, the build module may insert a function 580 into the root scope list. The build module may then insert an instruction to set a variable Function23 to zero at the start of the root scope list at 582. The build module may then insert instructions to jump to the return instruction if the Function23 variable is true at 584 (e.g., whether or not the function for the shared scope 2 and 3 has been triggered previously). An assignment of the value of one to the Function23 variable is then inserted for the first execution of the function for shared scope 2 and 3 at 586. The build module may then insert the instructions from the shared scope list for shared scope 2 and 3 at 588. Finally, the build module may insert, at 590, the marker for the jump instruction at 584 and insert a return instruction at 592.

Figure 6:
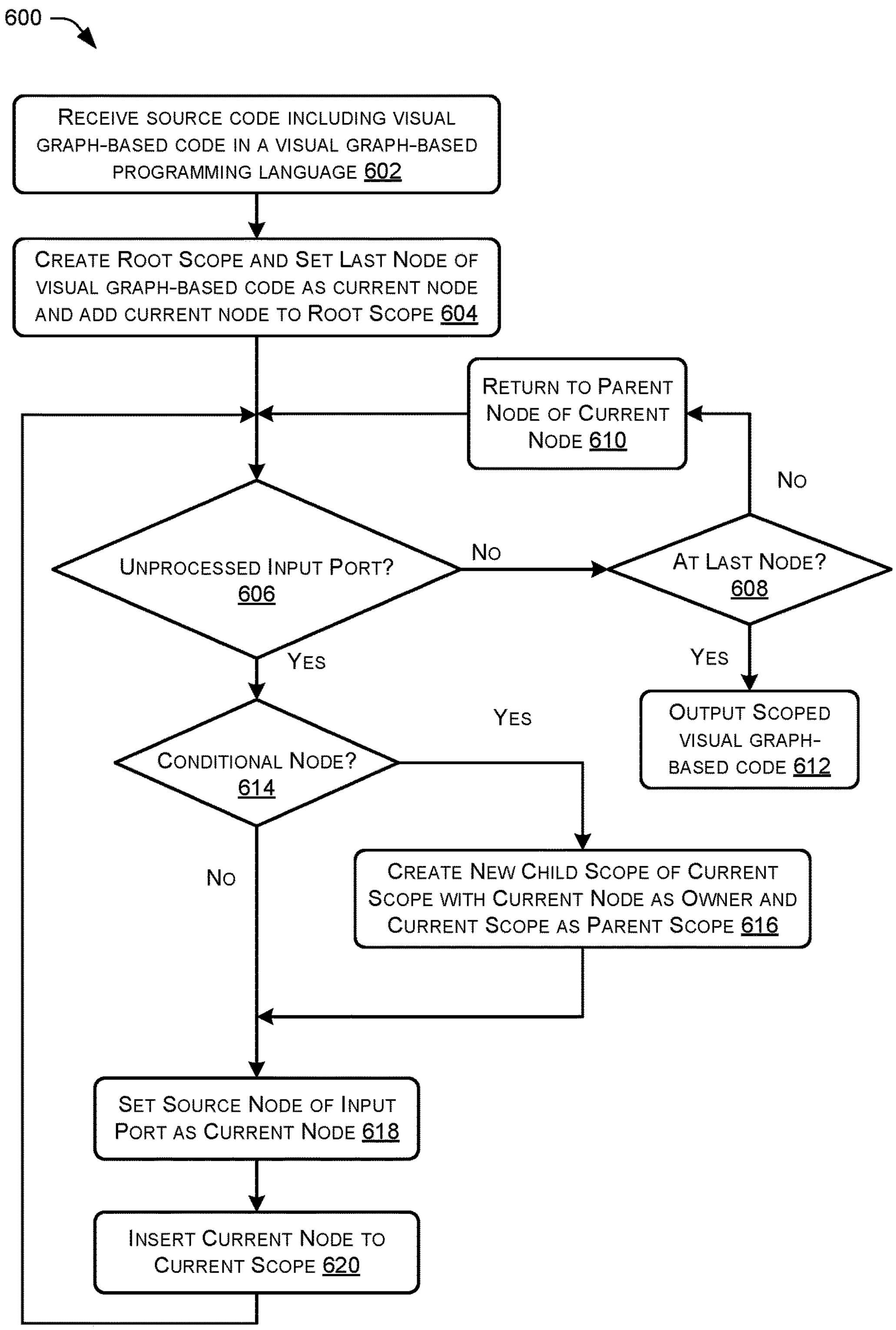
FIG. 6 illustrates a flow diagram of an example method that may be performed by a build module to determine scopes for a pull-based code, in accordance with example embodiments of the disclosure.

FIG. 6 illustrates a flow diagram of an example method 600 that may be performed by a build module to determine scopes for a pull-based code, in accordance with example embodiments of the disclosure. For ease of discussion, the method 600 is described below with respect to graph-based code. The method 600 may be performed by the system 100.

At block 602, the build module may receive source code including visual graph-based code in a visual graph-based programming language. At 604, the build module may create a root scope, set the last node of visual graph-based code as a current node and add the current node to the root scope.

Next, at 606, the build module may determine if the current node has an unprocessed input port. If not, the build module 104 may continue to 608. Otherwise, the build module 104 may continue to 614.

At 608, the build module may determine whether the current node is the last node in the graph. If not, the build module 104 may continue to 610. Otherwise, the build module 104 may continue to 612. At 612, the build module may output the scope visual graph-based code. Returning to 610, the build module may set the current node to the parent of the current node.

Returning to 614, the build module may be determined whether the current node is a conditional node. If so, the build module may continue to 616. Otherwise, the build module may continue to 618.

At 616, the build module may create a new child scope of the current scope with the current node as the owner and the current scope as the parent scope. The build module may then continue to 618.

At 618, the build module may set the source node of the unprocessed input port as the current node. The build module may then insert the current node to the current scope. The build module may then return to 606 until the traversal is complete.

It should be noted that some of the operations of method 600 may be performed out of the order presented, with additional elements, and/or without some elements. Some of the operations of method 600 may further take place substantially concurrently and, therefore, may conclude in an order different from the order of operations shown above. Further, implementations are not limited to the details of the above examples and variations are possible.

Figure 7:
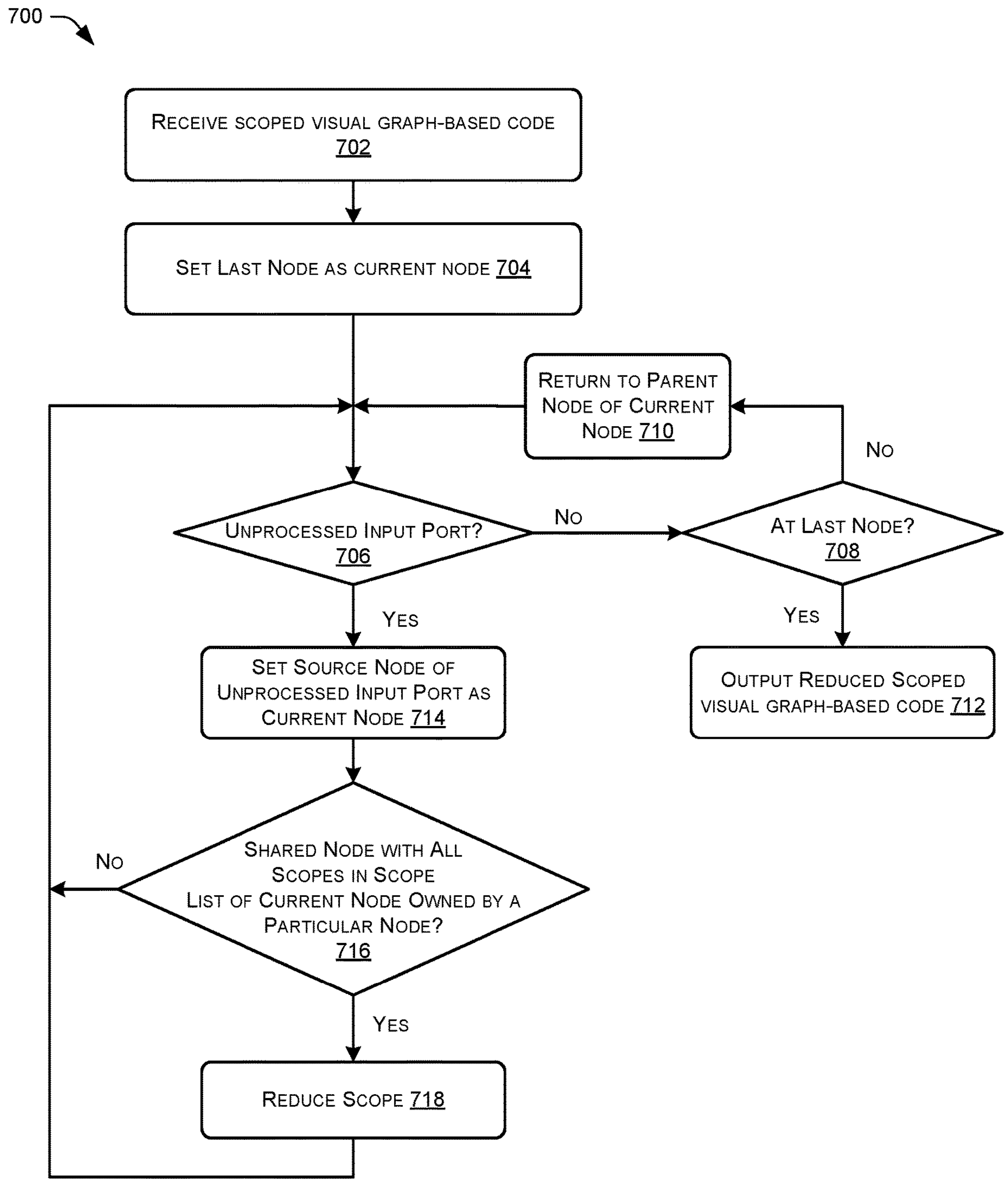
FIG. 7 illustrates a flow diagram of an example method that may be performed by a build module to determine reduced scopes for a scoped pull-based code, in accordance with example embodiments of the disclosure.

FIG. 7 illustrates a flow diagram of an example method 700 that may be performed by a build module to determine reduced scopes for a scoped pull-based code, in accordance with example embodiments of the disclosure. For ease of discussion, the method 700 is described below with respect to scoped graph-based code. The method 700 may be performed by the system 100.

At block 702, the build module may receive scoped visual graph-based code. At block 704, the build module may set the last node as current node. Then, at block 706, the build module may determine if the current node has an unprocessed input port. If not, the build module 104 may continue to 708. Otherwise, the build module 104 may continue to 714.

At 708, the build module may determine whether the current node is the last node in the graph. If not, the build module 104 may continue to 710. Otherwise, the build module 104 may continue to 712. At 712, the build module may output the scoped reduced visual graph-based code. Returning to 710, the build module may set the current node to the parent of the current node.

Returning to 714, the build module may set the source node of the unprocessed input port as the current node. At 716, the build module may determine whether all the scopes owned by an ancestor node of the current node owned match the scope list of the current node. Stated differently, the build module may determine if the scopes of a conditional node in the ancestry of the current node is coextensive with the scopes of the current node. If so, the build module may continue to 718. Otherwise, the build module may return to 706.

At 718, the build module may reduce the scope of the current node to the scope of the ancestor node. The build module may then return to 706.

It should be noted that some of the operations of method 700 may be performed out of the order presented, with additional elements, and/or without some elements. Some of the operations of method 700 may further take place substantially concurrently and, therefore, may conclude in an order different from the order of operations shown above. Further, implementations are not limited to the details of the above examples and variations are possible.

Figure 8:
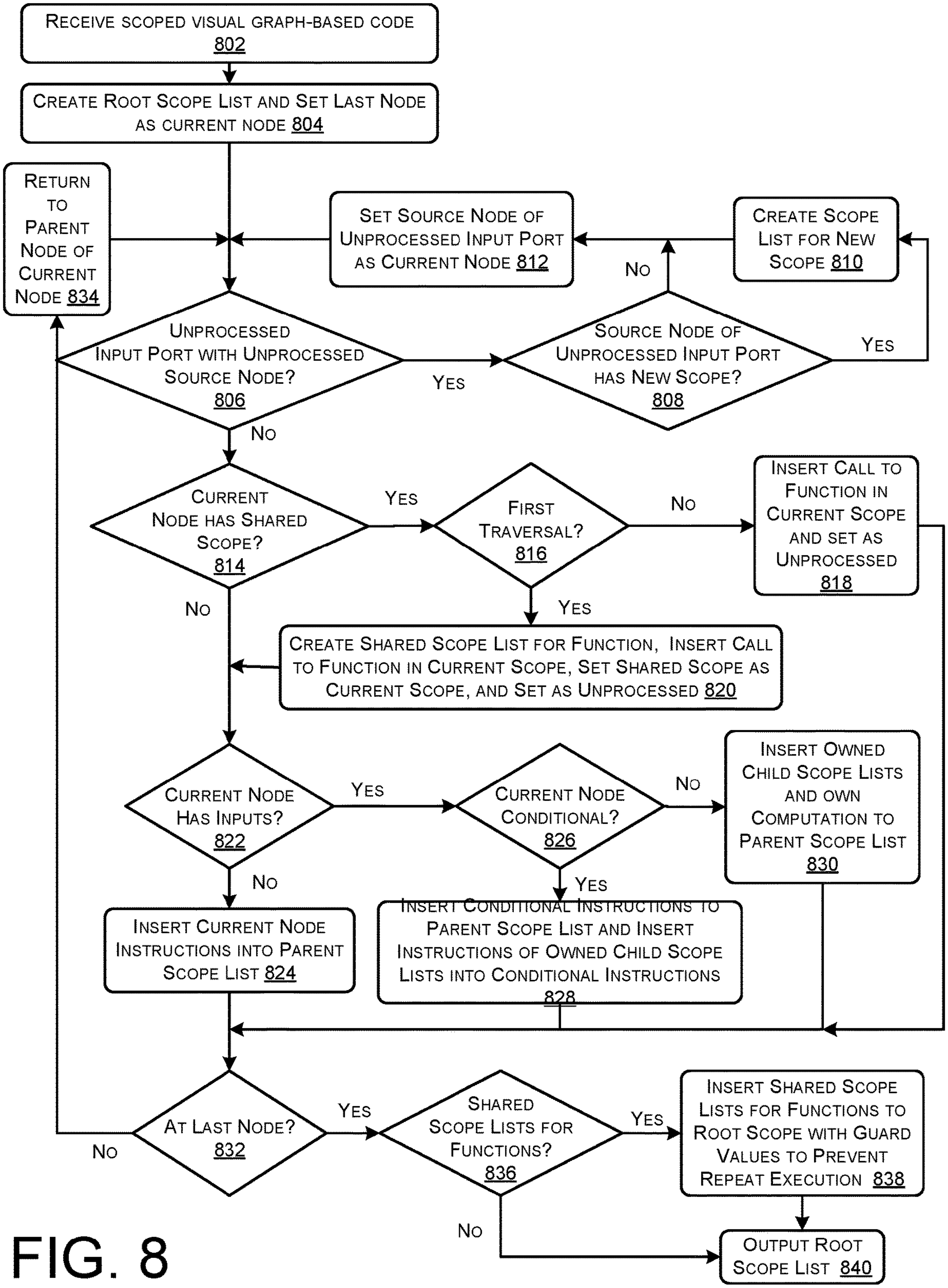
FIG. 8 illustrates a flow diagram of an example method that may be performed by a build module to determine push-based code based on scoped pull-based code, in accordance with example embodiments of the disclosure.

FIG. 8 illustrates a flow diagram of an example method 800 that may be performed by a build module to determine push-based code based on scoped pull-based code, in accordance with example embodiments of the disclosure. For ease of discussion, the method 800 is described below with respect to scoped graph-based code. The method 800 may be performed by the system 100.

At block 802, the build module may receive scoped visual graph-based code. At block 804, the build module may create a root scope list and set the last node of the graph-based code as a current node.

At block 806, the build module may determine if the current node has an unprocessed input port from an unprocessed source node. If so, the build module 104 may continue to 808. Otherwise, the build module 104 may continue to 814.

At block 808, the build module may determine whether the source node of unprocessed input port has a new scope. If so, the build module 104 may continue to 810 and create a scope list for the new scope. Otherwise, the build module 104 may continue to 812 and set the source node of the unprocessed input port as the current node.

Returning to block 814, the build module may determine whether the current node has a shared scope. If so, the build module 104 may continue to 816. Otherwise, the build module 104 may continue to 822.

At block 816, the build module may determine if this is the first traversal of the node with shared scope. If not, the build module 104 may continue to 818. Otherwise, the build module 104 may continue to 820.

At block 818, the build module may insert a call to a function for the shared scope into the current scope and set the current node as unprocessed to allow for further function calls for the other scopes of the shared scopes. The build module may then continue to 832.

Returning to block 820, the build module may create a shared scope list for a function for the shared scope. The build module may then insert a call to the function in the current scope list, set the shared scope as the current scope, and set the current node as unprocessed. The build module 104 may then continue to 822 (e.g., to process potential inputs of the current node in the shared scope).

At block 822, the build module may determine whether the current node has inputs. If not, the build module 104 may continue to 824. Otherwise, the build module may continue to 826.

At block 824, the build module may insert instructions for the current node into the parent scope list (or the root scope list if the current scope is the root scope). The build module may then continue to 832.

Returning to block 826, the build module may determine if the current node is a conditional node. If so, the build module 104 may continue to 828. Otherwise, the build module may continue to 830.

At block 828, the build module may insert conditional instructions of the current node into the parent scope list (or the root scope list if the current scope is the root scope) and insert instructions of child scope lists owned by the current node into the conditional instructions at appropriate insertion points. The build module may then continue to 832.

Returning to block 830, the build module may insert child scope lists owned by the current node and then computations of the current node into parent scope list (or the root scope list if the current scope is the root scope). The build module may then continue to 832.

At block 832, the build module may determine if the current node is the last node. If not, the build module 104 may continue to 834. Otherwise, the build module may return to 836. At block 834, the build module may set the parent node of the current node as the new current node.

Returning to block 836, the build module may determine if shared scope lists for functions have been generated. If so, the build module 104 may continue to 838. Otherwise, the build module may continue to 840.

At block 838, the build module may insert the shared scope lists for the functions to the root scope with guard instructions to prevent repeat execution of the shared scope instructions (e.g., as discussed above with respect to FIGS. 5A and 5B. The build module may then continue to 840.

At block 840, the build module may output the root scope list (e.g., which are instructions in a push-based code with equivalent function to the input scoped graph-based code).

It should be noted that some of the operations of method 800 may be performed out of the order presented, with additional elements, and/or without some elements. Some of the operations of method 800 may further take place substantially concurrently and, therefore, may conclude in an order different from the order of operations shown above. Further, implementations are not limited to the details of the above examples and variations are possible.

Figure 9:
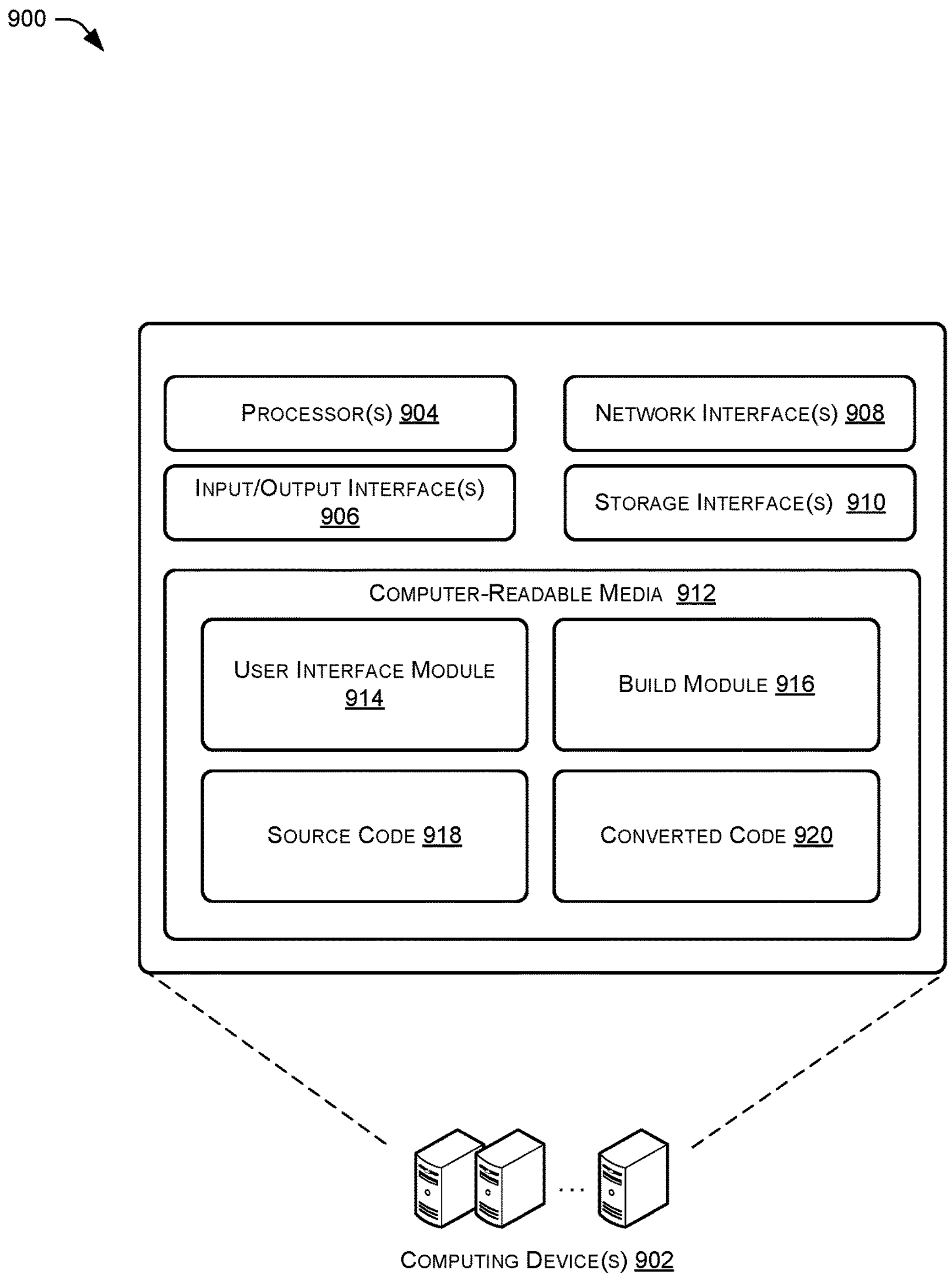
FIG. 9 illustrates a block diagram of an example system including one or more computing device(s) that may provide a programming environment that may convert pull-based program code into push-based program code, in accordance with example embodiments of the disclosure.

FIG. 9 illustrates a block diagram of an example system 900 including one or more computing device(s) 902 that may provide a programming environment that may interpret a pull-based representation of program code into a push-based representation, in accordance with example embodiments of the disclosure. The computing device(s) 902 may include one or more processor(s) 904, one or more input/output (I/O) interface(s) 906, one or more network interface(s) 908, one or more storage interface(s) 910, and computer-readable media 912.

In some implementations, the processors(s) 904 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 904 may possess its own local memory, which also may store program modules, program data, and/or one or more operating system(s). The one or more processor(s) 904 may include one or more cores.

The one or more input/output (I/O) interface(s) 906 may enable a user to interact with the user interface module 102 to enter and request a building of source code that includes pull-based programming (e.g., visual graph-based programming). The I/O interface(s) 906 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 908 may enable the system(s) 100 to communicate via the one or more network(s). The network interface(s) 908 may include a combination of hardware, software, and/or firmware and may include software drivers for enabling any variety of protocol-based communications, and any variety of wireline and/or wireless ports/antennas. For example, the network interface(s) 908 may comprise one or more of a cellular radio, a wireless (e.g., IEEE 802.1x-based) interface, a Bluetooth® interface, and the like. In some embodiments, the network interface(s) 908 may include radio frequency (RF) circuitry that allows the system(s) 100 to transition between various standards. The network interface(s) 908 may further enable the system(s) 100 to communicate over circuit-switch domains and/or packet-switch domains.

The storage interface(s) 910 may enable the processor(s) 904 to interface and exchange data with the computer-readable media 912, as well as any storage device(s) external to the system(s) 100, such as the user interface module block 914 (e.g., which may correspond to user interface module 102) and the build module block 916 (e.g., which may correspond to build module 104.

The computer-readable media 912 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 912 may be implemented as computer-readable storage media (CRSM), which may be any available physical media accessible by the processor(s) 904 to execute instructions stored on the computer readable media 912. In one basic implementation, CRSM may include RAM and Flash memory. In other implementations, CRSM may include, but is not limited to, ROM, EEPROM, or any other tangible medium which can be used to store the desired information and which can be accessed by the processor(s) 904. The computer-readable media 912 may have an operating system (OS) and/or a variety of suitable applications stored thereon. The OS, when executed by the processor(s) 904 may enable management of hardware and/or software resources of the system(s) 100.

Several functional blocks having instruction, data stores, and so forth may be stored within the computer-readable media 912 and configured to execute on the processor(s) 904. The computer readable media 912 may have stored thereon the user interface block 914 and the build module block 916. It will be appreciated that each of the functional blocks 914 and 916 may have instructions stored thereon that when executed by the processor(s) 904 may enable various functions pertaining to the operations of the system (s) 100.

The instructions stored in the user interface module block 914, when executed by the processor(s) 904, may configure the system(s) 100 to provide a programming environment which allows for pull-based programming. Through the user interface module block 914, the user may enter source code 918 including pull-based program code. The user interface module block 914 may further enable the user to operate the build module block 916 to compile or build the source code 918 to generate converted code 920 which may include push-based instructions. The build module block 916 may further operate as discussed above to generate compiled code (e.g., bytecode or other executable code) based on the converted code.

The illustrated aspects of the claimed subject matter may also be practiced in distributed computing environments where certain tasks are performed by remote processing devices that are linked through a communications network.

In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:

one or more processors; and one or more computer-readable media storing computer-executable instructions that, when executed by the one or more processors, cause the one or more processors to:

receive source code comprising pull-based programming language instructions, wherein the pull-based programming language instructions comprise a plurality of nodes connected by a plurality of edges to form a directed graph; and convert the source code into push-based programming language instructions at least in part by:

traversing the pull-based programming language instructions to determine one or more scopes of the directed graph including respective groups of one or more nodes of the plurality of nodes, the determining of the one or more scopes being associated with one or more conditional nodes of the plurality of nodes; and generating the push-based programming language instructions for the source code based on the one or more scopes of the directed graph; and generate byte code based on the push-based programming language instructions.

2. The system of claim 1, wherein the traversing includes:

determining a last node of the plurality of nodes in the directed graph;

assigning the last node to a root scope of the one or more scopes of the directed graph;

traversing the directed graph to a first source node, wherein an input of the last node is based at least in part on an output of the first source node;

determining the first source node is a conditional node that outputs one of a plurality of conditional inputs of the first source node based on a condition input of the first source node;

creating a new scope of the one or more scopes of the directed graph, the new scope owned by the first source node and associated with a conditional input of the plurality of conditional inputs; and assigning a second source node that is the source of the conditional input to the new scope.

3. The system of claim 2, wherein the traversing further includes:

assigning the first source node and a third source node that is the source of the condition input of the first source node to another scope associated with the first source node.

4. The system of claim 1, wherein converting the source code into push-based programming language instructions further includes performing a second traversal including:

determining a shared node is assigned to a first set of two or more scopes;

determining a second set of scopes owned by another node receiving an input based at least in part on an output of the shared node is coextensive with the first set of two or more scopes of the shared node; and reducing the first set of two or more scopes to another scope to which the other node is assigned.

5. The system of claim 1, wherein converting the source code into push-based programming language instructions further includes performing a second traversal including:

inserting push-based programming language instructions for a conditional node into a list of push-based programming language instructions associated with a scope of the conditional node, the list of push-based programming language instructions including an insertion point for push-based programming language instructions associated with a first scope owned by the conditional node and associated with a first conditional input of the conditional node; and inserting the push-based programming language instructions associated with the first scope owned by the conditional node into the list of instructions at the insertion point.

6. The system of claim 1, wherein converting the source code into push-based programming language instructions further includes performing a second traversal including:

inserting a function call associated with a shared scope of a shared node assigned a plurality of scopes into a list of push-based programming language instructions associated with a scope of another node that receives an output of the shared node as an input;

inserting push-based programming language instructions associated with a last node of the plurality of nodes into a list of push-based programming language instructions associated with a root scope; and subsequent to inserting the push-based programming language instructions associated with the last node into the list of push-based programming language instructions associated with the root scope:

inserting, into the list of instructions associated with the root scope, push-based programming language instructions of a function associated with the function call including push-based programming language instructions associated with the shared node.

7. The system of claim 6, wherein the push-based programming language instructions of the function further include push-based programming language instructions to exit the function before a second execution of the push-based programming language instructions associated with the shared node.

8. A computer-implemented method, comprising:

receiving source code comprising pull-based programming language instructions, wherein the pull-based programming language instructions comprise a plurality of nodes connected by a plurality of edges to form a directed graph;

converting the source code into push-based programming language instructions at least in part by:

traversing the pull-based programming language instructions to determine one or more scopes of the directed graph including respective groups of one or more nodes of the plurality of nodes, the determining of the one or more scopes being associated with one or more conditional nodes of the plurality of nodes; and generating the push-based programming language instructions for the source code based on the one or more scopes of the directed graph; and generating byte code based on the push-based programming language instructions.

9. The computer-implemented method of claim 8, wherein the traversing includes:

determining a last node of the plurality of nodes in the directed graph;

assigning the last node to a root scope of the one or more scopes of the directed graph;

traversing the directed graph to a first source node, wherein an input of the last node is based at least in part on an output of the first source node;

determining the first source node is a conditional node that outputs one of a plurality of conditional inputs of the first source node based on a condition input of the first source node;

creating a new scope of the one or more scopes of the directed graph, the new scope owned by the first source node and associated with a conditional input of the plurality of conditional inputs; and assigning a second source node that is the source of the conditional input to the new scope.

10. The computer-implemented method of claim 9, wherein the traversing further includes:

assigning the first source node and a third source node that is the source of the condition input of the first source node to another scope associated with the first source node.

11. The computer-implemented method of claim 8, wherein converting the source code into push-based programming language instructions further includes performing a second traversal including:

determining a shared node is assigned to a first set of two or more scopes;

determining a second set of scopes owned by another node receiving an input based at least in part on an output of the shared node is coextensive with the first set of two or more scopes of the shared node; and reducing the first set of two or more scopes to another scope to which the other node is assigned.

12. The computer-implemented method of claim 8, wherein converting the source code into push-based programming language instructions further includes performing a second traversal including:

inserting push-based programming language instructions for a conditional node into a list of push-based programming language instructions associated with a scope of the conditional node, the list of push-based programming language instructions including an insertion point for push-based programming language instructions associated with a first scope owned by the conditional node and associated with a first conditional input of the conditional node; and inserting the push-based programming language instructions associated with the first scope owned by the conditional node into the list of instructions at the insertion point.

13. The computer-implemented method of claim 8, wherein converting the source code into push-based programming language instructions further includes performing a second traversal including:

inserting a function call associated with a shared scope of a shared node assigned a plurality of scopes into a list of push-based programming language instructions associated with a scope of another node that receives an output of the shared node as an input;

inserting push-based programming language instructions associated with a last node of the plurality of nodes into a list of push-based programming language instructions associated with a root scope; and subsequent to inserting the push-based programming language instructions associated with the last node into the list of push-based programming language instructions associated with the root scope:

inserting, into the list of instructions associated with the root scope, push-based programming language instructions of a function associated with the function call including push-based programming language instructions associated with the shared node and push-based programming language instructions to exit the function before a second execution of the push-based programming language instructions associated with the shared node.

14. One or more non-transitory computer-readable media storing computer-executable instructions that, when executed by one or more processors, cause the one or more processors to perform operations comprising:

receiving source code comprising pull-based programming language instructions, wherein the pull-based programming language instructions comprise a plurality of nodes connected by a plurality of edges to form a directed graph; and converting the source code into push-based programming language instructions at least in part by:

traversing the pull-based programming language instructions to determine one or more scopes of the directed graph including respective groups of one or more nodes of the plurality of nodes, the determining of the one or more scopes being associated with one or more conditional nodes of the plurality of nodes; and generating the push-based programming language instructions for the source code based on the one or more scopes of the directed graph; and generating byte code based on the push-based programming language instructions.

15. The one or more non-transitory computer-readable media of claim 14, wherein the traversing includes:

determining a last node of the plurality of nodes in the directed graph;

assigning the last node to a root scope of the one or more scopes of the directed graph;

traversing the directed graph to a first source node, wherein an input of the last node is based at least in part on an output of the first source node;

determining the first source node is a conditional node that outputs one of a plurality of conditional inputs of the first source node based on a condition input of the first source node;

creating a new scope of the one or more scopes of the directed graph, the new scope owned by the first source node and associated with a conditional input of the plurality of conditional inputs; and assigning a second source node that is the source of the conditional input to the new scope.

16. The one or more non-transitory computer-readable media of claim 15, wherein the traversing further includes:

assigning the first source node and a third source node that is the source of the condition input of the first source node to another scope associated with the first source node.

17. The one or more non-transitory computer-readable media of claim 14, wherein converting the source code into push-based programming language instructions further includes performing a second traversal including:

determining a shared node is assigned to a first set of two or more scopes;

determining a second set of scopes owned by another node receiving an input based at least in part on an output of the shared node is coextensive with the first set of two or more scopes of the shared node; and reducing the first set of two or more scopes to another scope to which the other node is assigned.

18. The one or more non-transitory computer-readable media of claim 14, wherein converting the source code into push-based programming language instructions further includes performing a second traversal including:

inserting push-based programming language instructions for a conditional node into a list of push-based programming language instructions associated with a scope of the conditional node, the list of push-based programming language instructions including an insertion point for push-based programming language instructions associated with a first scope owned by the conditional node and associated with a first conditional input of the conditional node; and inserting the push-based programming language instructions associated with the first scope owned by the conditional node into the list of instructions at the insertion point.

19. The one or more non-transitory computer-readable media of claim 14, wherein converting the source code into push-based programming language instructions further includes performing a second traversal including:

inserting a function call associated with a shared scope of a shared node assigned a plurality of scopes into a list of push-based programming language instructions associated with a scope of another node that receives an output of the shared node as an input;

inserting push-based programming language instructions associated with a last node of the plurality of nodes into a list of push-based programming language instructions associated with a root scope; and subsequent to inserting the push-based programming language instructions associated with the last node into the list of push-based programming language instructions associated with the root scope:

inserting, into the list of instructions associated with the root scope, push-based programming language instructions of a function associated with the function call including push-based programming language instructions associated with the shared node and push-based programming language instructions to exit the function before a second execution of the push-based programming language instructions associated with the shared node.

* * * * *